US006496902B1

(12) United States Patent
Faanes et al.

(10) Patent No.: US 6,496,902 B1
(45) Date of Patent: Dec. 17, 2002

(54) VECTOR AND SCALAR DATA CACHE FOR A VECTOR MULTIPROCESSOR

(75) Inventors: Gregory J. Faanes, Eau Claire, WI (US); Eric P. Lundberg, Esau Claire, WI (US)

(73) Assignee: Cray Inc., Seattle, WA (US)

( * ) Notice: Subject to any disclaimer, the term of this patent is extended or adjusted under 35 U.S.C. 154(b) by 0 days.

(21) Appl. No.: 09/223,853

(22) Filed: Dec. 31, 1998

(51) Int. Cl.$^7$ ................. G06F 12/100; G06F 13/00
(52) U.S. Cl. ................ 711/118; 712/3; 712/4; 712/11; 712/207
(58) Field of Search ................ 711/118; 712/32, 712/3, 4, 10, 11, 207

(56) References Cited

U.S. PATENT DOCUMENTS

| | | | | |
|---|---|---|---|---|
| 4,268,772 A | * | 5/1981 | Workman | 310/197 |
| 4,661,900 A | | 4/1987 | Chen et al. | 364/200 |
| 4,888,679 A | * | 12/1989 | Fossum et al. | 364/200 |
| 5,197,130 A | * | 3/1993 | Chen et al. | 395/325 |
| 5,349,667 A | | 9/1994 | Kaneko | 395/725 |
| 5,551,010 A | * | 8/1996 | Iino et al. | 395/496 |
| 6,058,465 A | * | 5/2000 | Nguyen | 712/7 |

OTHER PUBLICATIONS

Kontothanassis, L. I., et al., "Cache Performance in Vector Supercomputers", Cray Research Inc., 1–10.

* cited by examiner

Primary Examiner—Matthew Kim
Assistant Examiner—Pierre M. Vital
(74) Attorney, Agent, or Firm—Schwegman, Lundberg, Woessner & Kluth, P.A.

(57) ABSTRACT

A common scalar/vector data cache apparatus and method for a scalar/vector computer. One aspect of the present invention provides a computer system including a memory. The memory includes a plurality of sections. The computer system also includes a scalar/vector processor coupled to the memory using a plurality of separate address busses and a plurality of separate read-data busses wherein at least one of the sections of the memory is associated with each address bus and at least one of the sections of the memory is associated with each read-data bus. The processor further includes a plurality of scalar registers and a plurality of vector registers and operating on instructions which provide a reference address to a data word. The processor includes a scalar/vector cache unit that includes a cache array, and a FIFO unit that tracks (a.) an address in the cache array to which a read-data value will be placed when the read-data value is returned from the memory, and (b.) a destination code that specifies which of the scalar registers and vector registers into which the read-data value is to be loaded when the read-data value is returned from the memory.

38 Claims, 5 Drawing Sheets

VECTOR AND SCALAR DATA CACHE FOR A VECTOR MULTIPROCESSOR

FIELD OF THE INVENTION

The present invention relates to cache memories for high-speed computers and more specifically to cache memories for vector and scalar data in a computer having vector/scalar processors.

BACKGROUND OF THE INVENTION

A high-speed computer needs fast access to data in memory. The largest and fastest of such computers are known as supercomputers. One method of speeding up a computer is by "pipelining," wherein the computer's digital logic between an input and an output is divided into several serially connected successive stages. Data are fed into the computer's input stage before data previously input are completely processed through the computer's output stage. There are typically many intermediate stages between the input stage and the output stage. Each stage performs a portion of the overall function desired, adding to the functions performed by previous stages. Thus, multiple pieces of data are in various successive stages of processing at each successive stage of the pipeline between the input and output stages. Preferably, each successive system clock propagates the data one stage further in the pipeline.

As a result of pipelining, the system clock can operate at a faster rate than the speed of system clocks of non-pipelined machines. In some of today's computers, the system clock cycles in as fast as one nanoseconds ("ns") or less, allowing up to billion operations per second or more though a single functional unit. Parallel functional units within each processor, and parallel processors within a single system, allow even greater throughput. Achieving high-performance throughputs is only possible, however, if data are fed into each pipeline at close to the system clock rate.

As processor speeds have increased, the size of memory in a typical computer has also increased drastically. In addition, error-correction circuitry is now placed in the memory path to increase reliability. Memory-access speeds have improved over time, but the increased size of memory and the complexity of error-correction circuitry have meant that memory-access time has remained approximately constant. For example, a typical supercomputer system clock rate may have improved from roughly 8 ns to 4 ns to 2 ns to 1 ns over four generations. Over the same time period, memory-access times may have remained at approximately 60 to 100 ns. These times mean that with a 96 ns memory, the 8-ns processor accesses memory in 12 clocks, the 4-ns processor in 24 clocks, and the 2-ns processor in 48 clocks. As a result, a computer which randomly accessed data throughout memory would see almost no overall data-processing-speed improvement even if the system clock rate is increased dramatically.

One solution has been to organize data into vectors, each including a plurality of data elements, and where, during processing, each element of a vector has similar operations performed on it. Computer designers schedule various portions of the memory to simultaneously fetch various elements of a vector, and these fetched elements are fed into one or more parallel pipelines on successive clock cycles. Within a processor, the vector is held in a vector register having a plurality of vector register elements. Each successive vector-register element holds a successive element of the vector. A "vector-load" operation transfers a vector from memory into a vector register. For example, a vector in memory may be held as a vector image wherein successive elements of the vector are held in successive locations in memory. A vector-load operation moves elements which include a vector into pipelines which couple memory to the vector registers. Overlapped with these vector-load operations, there could be two other pipelines taking data from two other vector registers to feed a vector processor, with the resultant vector fed through a pipeline into a third vector register. Examples of such designs are described in U.S. Pat. No. 4,661,900 issued Apr. 28, 1987 to Chen et al. and U.S. Pat. No. 5,349,667 issued Sept. 20, 1994 to Cray et al., which are hereby incorporated by reference. For example, in a well-tuned system using 2-ns pipeline clocks, the throughput can approach 500 million operations per second for a single vector processor, even with relatively slow memory-access times.

On the other hand, a scalar processor operating in such a system on somewhat randomly located data must deal with a 48-clock to 70-clock pipelined-memory access time, and must often wait for the results from one operation before determining which data to request next.

In very-high-speed vector processors, such as the Cray Y-MP C90 manufactured by Cray Research Inc., the assignee of the present invention, a computer system contains a number of central processing units ("CPUs"), each of which may have more than one vector processor and more than one scalar processor. The computer system also contains a number of common memories which store the programs and data used by the CPUs. Vector data are often streamed or pipelined into a CPU from the memories, and so a long access time may be compensated for by receiving many elements on successive cycles as the result of a single request. In contrast, scalar data read by one of the CPUs from one of the common memories may take an inordinate amount of time to access.

A cache is a relatively fast small storage area inserted between a relatively slow bulk memory and a CPU to improve the average access time for loads and/or stores. Caches are filled with data which, it is predicted, will be accessed more frequently than other data. Accesses from the cache are typically much faster than accesses from the common memories. A "cache hit" is when requested data are found in the data already in the cache. A "cache miss" is when requested data cannot be found in the data already in the cache, and must therefore be accessed more slowly from the common memories. A "cache-hit ratio" is the ratio of requests which result in cache hits divided by the total of cache hits and cache misses. A system or program which has a high cache-hit ratio will usually have better performance than a machine without cache. On the other hand, a poor cache-hit ratio may result in much poorer performance, since much of the memory bandwidth is used up fetching data into the cache which will never be used.

SUMMARY OF THE INVENTION

A method and apparatus for a common scalar/vector data cache apparatus for a scalar/vector computer.

One aspect of the present invention provides a computer system. The computer system includes a common memory. The memory includes a plurality of sections. The computer system also includes a scalar/vector processor coupled to the memory using a plurality of separate address busses and a plurality of separate read-data busses wherein at least one of the sections of the memory is associated with each address bus and at least one of the sections of the memory is associated with each read-data bus. The processor further includes a plurality of scalar registers and a plurality of vector registers and operating on instructions which provide a reference address to a data word. The processor includes a scalar/vector cache unit that includes a cache array, and a FIFO unit that tracks (a.) an address in the cache array to which a read-data value will be placed when the read-data value is returned from the memory, and (b.) a destination code that specifies which of the scalar registers and vector registers into which the read-data value is to be loaded when the read-data value is returned from the memory.

In some embodiments, fetched instructions are also passed through the cache. In some such embodiment, the system allows instruction fetching through the cache to be selectably disabled. In some embodiments the system allows data fetching (i.e., both scalar fetching and vector fetching) through the cache to be selectably disabled. In some embodiments, the selective enabling/disabling of fetches through the cache of instructions and data are separately and independently specified.

In one embodiment, the cache unit fetches a different amount of data based on whether a read-data operation is for a scalar registers or a vector register. In another embodiment, the FIFO unit provides a plurality of FIFOs, each FIFO associated with one or more of the sections of the memory. In one such embodiment, the memory includes about eight sections, the FIFO unit includes an equal number of FIFOs, one of the FIFOs associated with each one of the sections, and each FIFO including about forty-eight positions.

In another embodiment, the scalar/vector processor is further coupled to the memory using one or more separate write-data busses, and wherein the write-data busses are fewer in number than the read-data busses.

In yet another embodiment, the cache unit includes a plurality of caches including a first cache and a second cache, and wherein a first subset of the sections is associated with the first cache and a different subset of the sections is associated with the second cache.

Another aspect of the present invention provides a method for caching data in a computer system such as that described above. In one embodiment, the method includes transmitting a series of addresses on each of the plurality of address busses requesting that a plurality read-data values be placed on each of the plurality of read-data busses, and for each address on each address bus, tracking both (a.) an address in the cache array to which a read-data value will be placed when the read-data value is returned from the memory, and (b.) a destination code that specifies which of the scalar registers and vector registers into which the read-data value is to be loaded when the read-data value is returned from the memory.

In one embodiment, the method further includes fetching a different amount of data based on whether a read-data operation is for a scalar register or a vector register. In another embodiment, the method further includes dividing read requests into groups of requests based on which section each read request is directed towards, and the step of tracking further includes separately tracking each of the groups of requests. In one such embodiment, the memory includes about eight sections, one of the groups associated with each one of the sections, and each group including up to about forty-eight requests.

In one embodiment if the method, the step of transmitting addresses includes transmitting a read request or a write request on each address bus, and wherein the number of write requests which can be transmitted in a given period of time is fewer than the number of read requests.

In another embodiment, the cache unit includes a plurality of caches including a first cache and a second cache and the method further includes associating a first subset of the sections with the first cache and a different subset of the sections with the second cache.

Thus the present invention provides a scalar/vector cache that can transmit a series of requests on each of a plurality of busses, each bus connected to a separate section of memory. The address of position in the cache, as well as the destination register for each data value is tracked, for example in a FIFO, such that a plurality of requests can be outstanding at any one time. Different parameters can be used for prefetching based on whether the request is for a scalar register or a vector register, thus optimizing the amount of prefetching done.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
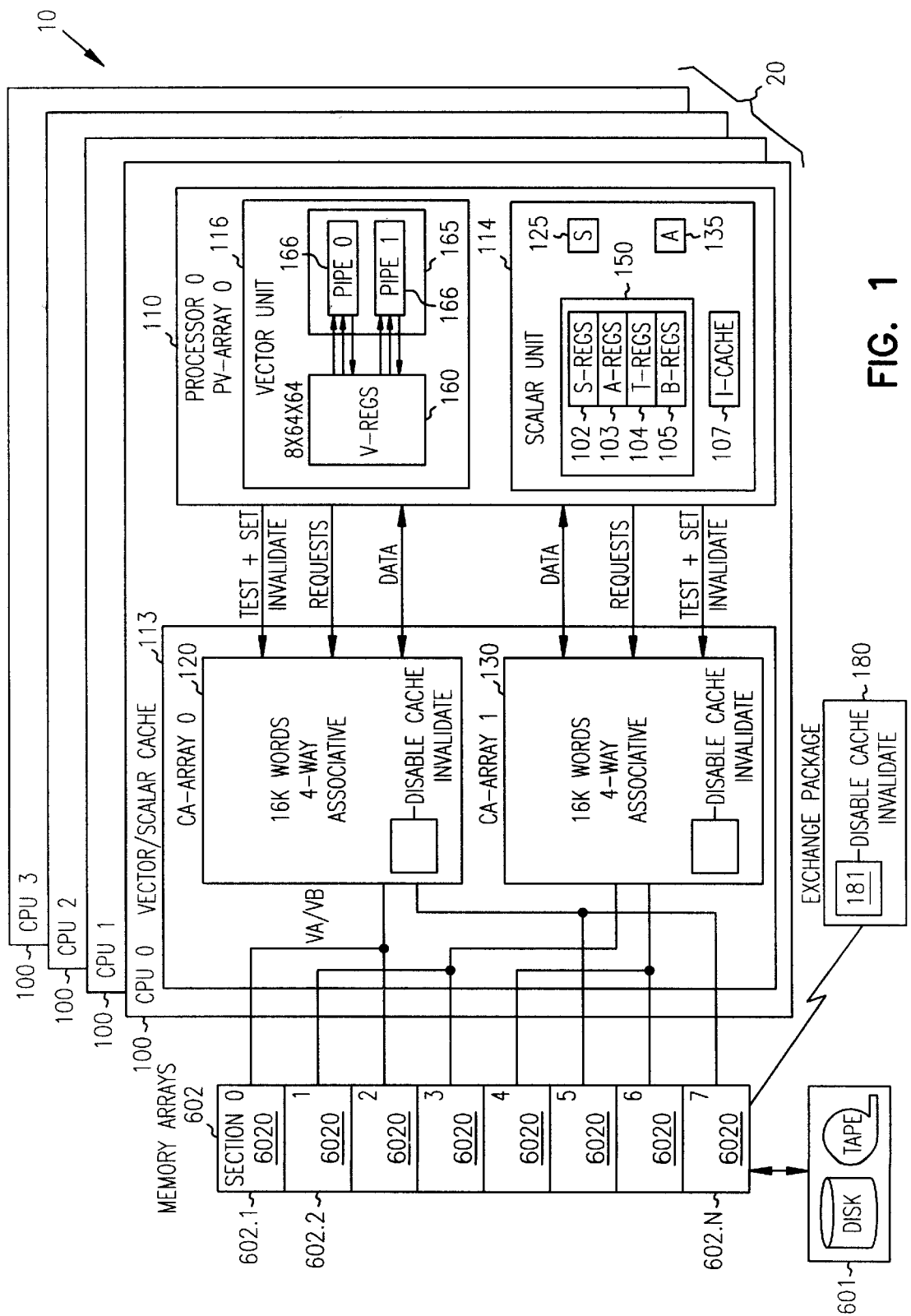
FIG. 1 is a schematic diagram of a scalar/vector computer system 10 constructed according to the present invention.
Figure 2:
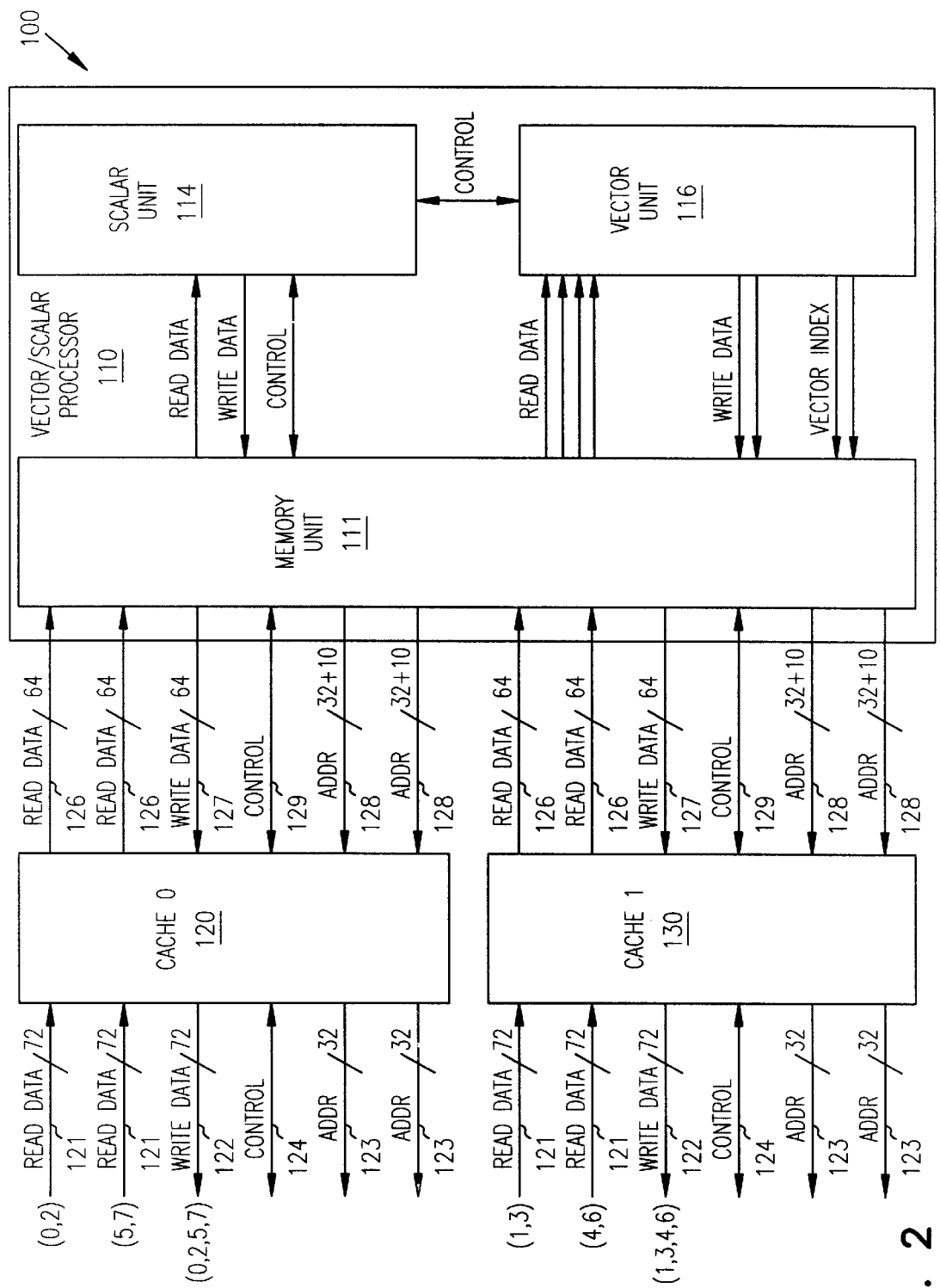
FIG. 2 is a schematic diagram illustrating details of an embodiment of scalar/vector data cache.

FIG. 1 is a schematic diagram illustrating an embodiment of a scalar/vector supercomputer 10 constructed according to the present invention. Scalar/vector supercomputer 10 includes one or more scalar/vector processor CPUs 100 connected through a common-memory interface 112 to one or more sections 602O of common memories (labeled 602.1 through 602.M), collectively referred to as common memories 602. "Memory" for main memory 602 in various embodiments includes main memories, such as those implemented with dynamic random access memories (DRAMs), static random access memories (SRAMs) and video random access memories (VRAMs). In one embodiment, system 10 also includes mass-storage devices 601, for example hard magnetic disks, optical disks, and magnetic tape units, each configured to transfer data to and from common memories 602. In one embodiment, CPU 100 is one of a plurality of substantially similar CPUs 100, each connected to common memories 602. In one such embodiment, common-memory interface 112 to common memories 602 includes a plurality of address ports, and a plurality of write-data-out ports and read-data-in ports, each data port being 64 data bits wide, and each address port being 32 bits wide. In one such embodiment, (See FIG. 2) each CPU 100 includes four 64-bit-wide read-data-in ports 121 (two coupled to cache-0 120, and two coupled to cache-1 130), two 64-bit-wide write-data-out ports 122 (one coupled to cache-0 120, and one coupled to cache-1 130), and four 32-bit-wide address ports 123 (two coupled to cache-0 120, and two coupled to cache-1 130). In one such embodiment, one read-data-in port 121 to cache-0 120 is connected from sections 0 and 2 of common memory 602, another read-data-in port 121 to cache-0 120 is connected from sections 5 and 7 of common memory 602, and the write-data-out port 122 from cache-0 120 is connected to sections 0, 2, 5 and 7 of common memory 602; one read-data-in port 121 to cache-1 120 is connected from sections 1 and 3 of common memory 602, another read-data-in port 121 to cache-1 120 is connected from sections 4 and 6 of common memory 602, and the write-data-out port 122 from cache-0 120 is connected to sections 1, 3, 4 and 6 of common memory 602. This facilitates acquiring vector data from frequently used strides in memory, such as strides of 1, 2, and 4 (a "stride" is the distance between consecutive elements of data for a vector read or write to memory). In another embodiment, common memories 602 includes only a single section of common memory 602.1.

In one embodiment of the system shown in FIG. 1, each CPU 100 includes scalar unit 114 including S registers 102, A registers 103, T registers 104, B registers 105, instruction buffers 107, scalar processor 125, and address processor 135; and vector unit 116 including V registers 160 and vector processor 165. Common-memory interface 112 provides access for scalar/vector processor CPU 100 to common memories 602.

Figure 3:
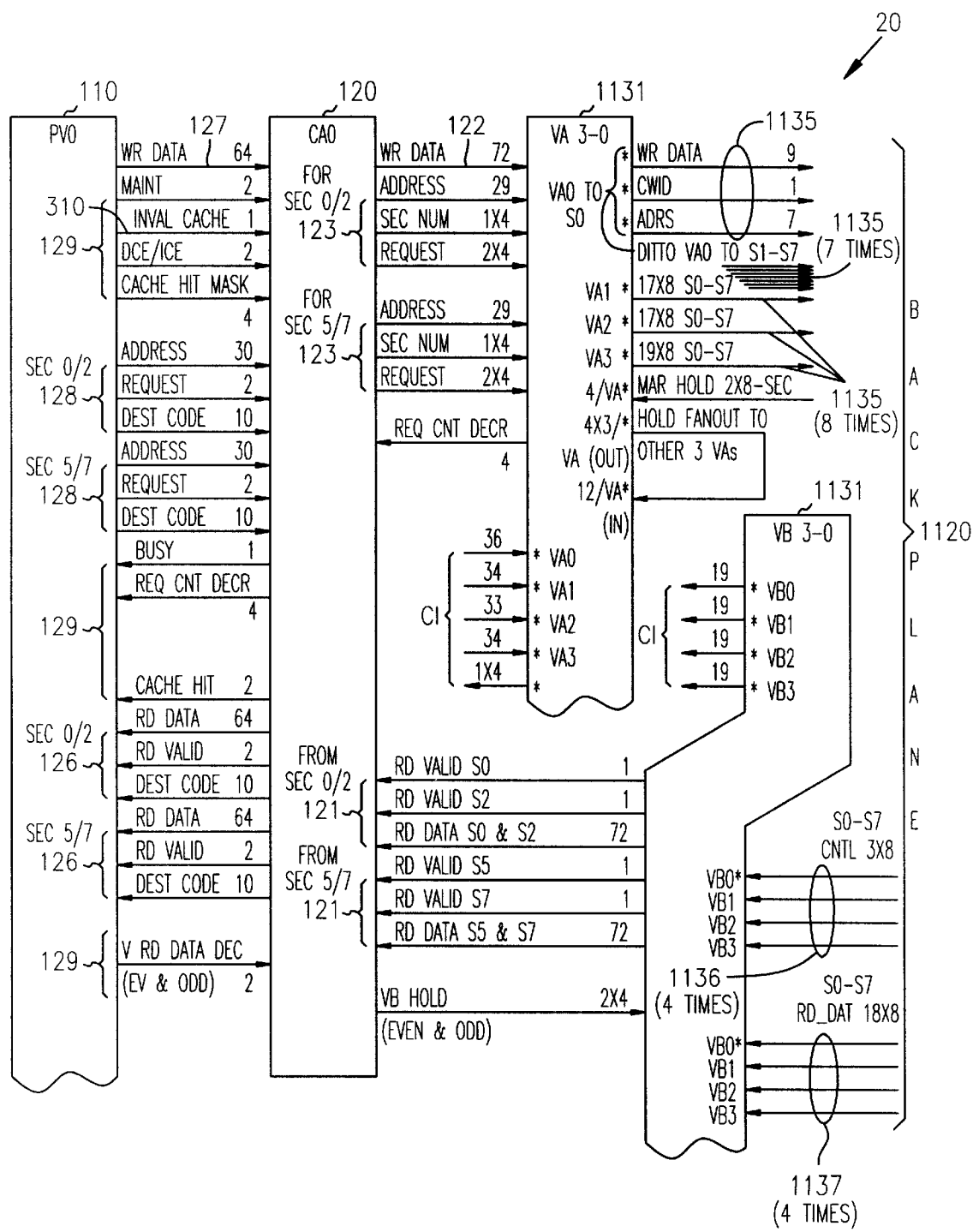
FIG. 3 shows a representation of a portion of multi-processor system 20.

In one embodiment, common memories 602 are also connected through common-memory interface 112 to a plurality of other scalar/vector processor CPUs 100 (for example CPU1, CPU2, and CPU3, each substantially similar to CPU0 100), forming a multi-processor system 20. In one embodiment, common memory interface 112 is comprised of a plurality of interconnected VA/VB interfaces 113, one for each CPU 100. In one embodiment, four CPUs 100 form a multi-processor system 20 implemented on a single multiprocessor card 420 having a common memory interface 112 at a backplane connector 1120 (see FIG. 3 and 4). In the embodiment, an approximately one-eighth-portion of which is shown in FIG. 3, a four-CPU multi-processor system 20 includes four vector-scalar processors 110 (each substantially implemented on a single chip, i.e., PV0, PV1, PV2 and PV3), wherein each vector-scalar processor 110 has two caches 120 (i.e., vector-scalar processor 110 labeled PV0 connects to caches 120 labeled CA0 and CA1, vector-scalar processor 110 labeled PV1 connects to caches 120 labeled CA2 and CA3, vector-scalar processor 110 labeled PV2 connects to caches 120 labeled CA4 and CA5, and vector-scalar processor 110 labeled PV3 connects to caches 120 labeled CA6 and CA7). The eight caches 120 (labeled CA0 through CA7) are connected to four output-crossbar chips 1131 labeled VA0 through VA3, and to four input-crossbar chips 1132 labeled VB0 through VB3, wherein the four output-crossbar chips 1131 and the four input-crossbar chips 1132 together form VA/VB interface 113 (see FIG. 1). In one such embodiment, the output-crossbar chips 1131 and the input-crossbar chips 1132 are all designed to be the same chip type, but are programmed by the way they are wired on the board and/or by data loaded into the chips to provide distinct input or output functions as desired (see FIG. 4).

In one embodiment, cache chips CA0 120 and CA1 130 of cache 200 are implemented in RAM (random-access memory) blocks using IBM 6S technology. In one such embodiment, a pair of identical application-specific integrated circuit (ASIC) chips are used for each cache 200. In one embodiment, cache 200 adds approximately six clock periods of latency to each miss (over what the design would provide without a cache), but reduces the memory latency by approximately sixty-five clock periods for read references that hit in the cache.

In one embodiment, the two cache chips are entirely independent, each providing a 4-way set associative cache for four of the eight sections 6020 of memory 602. The even port of cache chip CA0 120 handles the references to sections 0 and 2 of memory 602, the odd port of cache chip CA0 120 handles the references to sections 5 and 7 of memory 602, the even port of cache chip CA1 130 handles the references to sections 4 and 6 of memory 602, and the odd port of cache chip CA1 130 handles the references to sections 1 and 3 of memory 602. in one embodiment, each cache chip (120 or 130) includes 16,384 words (16 K words) of cache, for a total of 32 K words per processor 110, wherein each "word" includes 64-bits of data, and optionally 8 bits of parity or single-error correct, double-error detect ("SECDED") error correction code.

FIG. 3 shows a representation of about one-eighth of a multi-processor system 20. In the embodiment shown, vector-scalar processor 110 labeled PV0 (about one-half of processor PV0 is shown, as indicated by the jagged line at its bottom) is connected to two caches 120 (CA0 shown and CA1 not shown) wherein each cache connects via separate and different copies of one write-data bus 127 (64 bits wide in this embodiment), two address/request busses 128, two read-data busses 126, plus control lines 129. This allows each processor 110 to send parallel requests to up to four different addresses on each clock cycle, providing up to 2 write requests and/or up to four read requests. As shown, two address busses, two read busses, and one write bus are connected to cache chip CA0 120, and similarly but not shown, two address busses, two read busses, and one write bus are connected to cache chip CA1 130 in the same manner. In this embodiment, each address bus 128 includes 30 bits of address, two bits encoding the request, and 10 bits indicating a destination code (i.e., where read data is to be written when it returns). In this embodiment, each read-data bus 126 includes 64 bits of read data, 2 bits indicating read valid, and 10 bits of destination code. In this embodiment, cache chip CA0 120 adds parity (one bit parity per 8-bit byte) to the write data, thus outputting a 72-bit wide write data bus 122. In another embodiment, cache chip CA0 120 adds error checking and correction (ECC) (8 bits ECC per 64-bit word which provides single-error correct, double-error detect (SECDED) protection) to the write data, thus outputting a 72-bit wide write data bus 122. This provides error checking and/or correction to the memory data. Similarly, 72 bits of read data are returned on the two read-data busses 121, and the parity (or ECC) is checked and stripped off by cache chip CA0 120 to provide 64-bit wide read data on the busses 126.

In one embodiment, one address bus 128 between processor PV0 110 and cache chip CA0 120 is dedicated to requests from memory sections 0 and 2, and another one address bus 128 between processor PV0 110 and cache chip CA0 120 is dedicated to requests from memory sections 5 and 7. Each of these address busses 128 includes 30 bits of address, two bits of request indication, and ten bits of destination code. Cache chip CA0 then drives two address busses 123, one dedicated to sections 0 and 2, and another dedicated to sections 5 and 7; wherein each bus 123 includes 29 bits of address, four bits of section indication, and eight bits of request indication. Cache chip 120 then maintains a 48-position deep first-in-first-out ("FIFO") 520 (see FIG. 5 below for more description) for each of the eight memory sections which maintains information to track the cache position and destination code for every memory reference (i.e., for each read operation, FIFO 520 tracks where in the cache the read data will be placed, and which destination register to load with the read data when in returns).

In the embodiment shown, each of the four VA crossbar chips 1131 drives one quarter of the write-data bits and address bits to each of the eight sections of memory 602 (to even loading and reduce simultaneous-switch problems). That is, the write data bus 122 and the two address busses 123 from cache CA0 chip 120 drive all four VA crossbar chips 1131, then the VA0 crossbar chip 1131 drives a first 17 bits (9 bits of WR data, 1 bit of control, and 7 bits of address) on a bus 1135 to memory 602 section 6020 S0 ("S0") while the VA1 crossbar chip 1131 drives a second 17 bits (9 bits of WR data, 1 bit of control, and 7 bits of address) to memory 602 section 0 ("S0"), the VA2 crossbar chip 1131 drives a third 17 bits (9 bits of write data, 1 bit of control, and 7 bits of address) to memory 602 section 0 ("S0"), and the VA3 crossbar chip 1131 drives a fourth 17 bits (9 bits of WR data, 1 bit of control, and 7 bits of address) to memory 602 section 0 ("S0"), for a total of 68 bits (36 bits WR DATA, 4 bits control, and 28 bits address). Similarly, the four VA crossbar chips 1131 provide separate parallel busses 1135 to each of the other seven sections of memory 602 (S1 through S7). Thus, a total of thirty-two busses 1135, eight from each of four VA chips 1131, are passed to memory 602.

In one embodiment, the sections of memory are configured such that consecutive words of data (i.e., words that are stored in consecutive addresses in the address space of system 10) are placed in separate sections 6020 of memory 602. In a system having eight sections of memory, for example, words from addresses 0, 8, 16, etc are placed in section 0, words from addresses 1, 9, 17, etc are placed in section 1, etc.

In one embodiment, the address busses 128 from each processor 110 are clocked at 300 MHz (one request every 3.33 nanoseconds on each of four address busses from each processor 110 to its cache chips 120). In one such embodiment, each processor 110 will make requests to a given section 6020 (for example, section S0) of memory 602 at most on every other clock cycle. Since each bus handles requests for two sections, the requests can be interleaved such that each clock has a request, for example, successive clocks on one of the address busses 128 would have requests to sections S0, S2, S0, S2, S0, etc. The two cache chips 120 of each processor 100 drive their four address busses 123 at 300 MHz to the VA chips 1131 (one request every 3.33 nanoseconds on each of four address busses from each pair of cache chips 120 to the system's four VA chips 1131). The four VA chips of system 10 then drive the memory 602 at 100 MHz (one request every ten nanoseconds on each of eight address busses from the system's four VA chips 1131 to memory 602).

In this embodiment, the four VA chips of system 10 are accepting requests from each of four processors 100, and providing a small amount of buffering for these requests. When this buffering is full, handshaking between the VA chips 1131 and the cache chips 120 prevent further requests until space is again available (i.e., further requests are held off. Similarly, handshaking between the cache chips 120 and each processor 110 will hold off further requests from the processor 110 if the cache chips 120 cannot accept the requests and pass them to the VA chips.

In the embodiment shown, each of the four VB crossbar chips 1132 receives one quarter of the read-data bits and control bits from each of the eight sections of memory 602 (to even loading and reduce simultaneous-switch problems). That is, crossbar chip VB0 1132 receives a first 3 bits of control and 18 bits of read data from memory 602 section S0, chip VB1 receives a second 3 bits of control and 18 bits of read data from memory 602 section S0, chip VB2 receives a third 3 bits of control and 18 bits of read data from memory 602 section S0, and chip VB3 receives a fourth 3 bits of control and 18 bits of read data from memory 602 section S0, for a total of 12 bits of control and 72 bits of data from section S0 of memory 602 into the four VB chips 1132. Thus, crossbar chip VB0 receives 3 bits of control and 18 bits of read data from each of eight sections (S0 through S7) of memory 602; crossbar chip VB1 receives 3 bits of control and 18 bits of read data from each of eight sections (S0 through S7) of memory 602; crossbar chip VB2 receives 3 bits of control and 18 bits of read data from each of eight sections (S0 through S7) of memory 602; and crossbar chip VB3 receives 3 bits of control and 18 bits of read data from each of eight sections (S0 through S7) of memory 602. The four VB chips 1132 then drive a first read-data bus 121 to cache chip CA0 120 for sections 0 and 2 (this bus having 72 bits of read data (with parity or ECC), plus a read-valid bit for section S0 and a read-valid bit for section 2), and a similar second read-data bus 121 to cache chip CA0 120 for sections 5 and 7 of memory 602. The four VB chips 1132 also drive a first read-data bus 121 to cache chip CA1 130 for sections 1 and 3 and a similar second read-data bus 121 to cache chip CA1 130 for sections 4 and 6 of memory 602.

Since, in the embodiment shown in FIG. 3, each of the eight sections of memory is provided a separate address bus, read-data bus and write data bus, up to eight independent operations to unrelated addresses can be performed substantially simultaneously.

Figure 4:
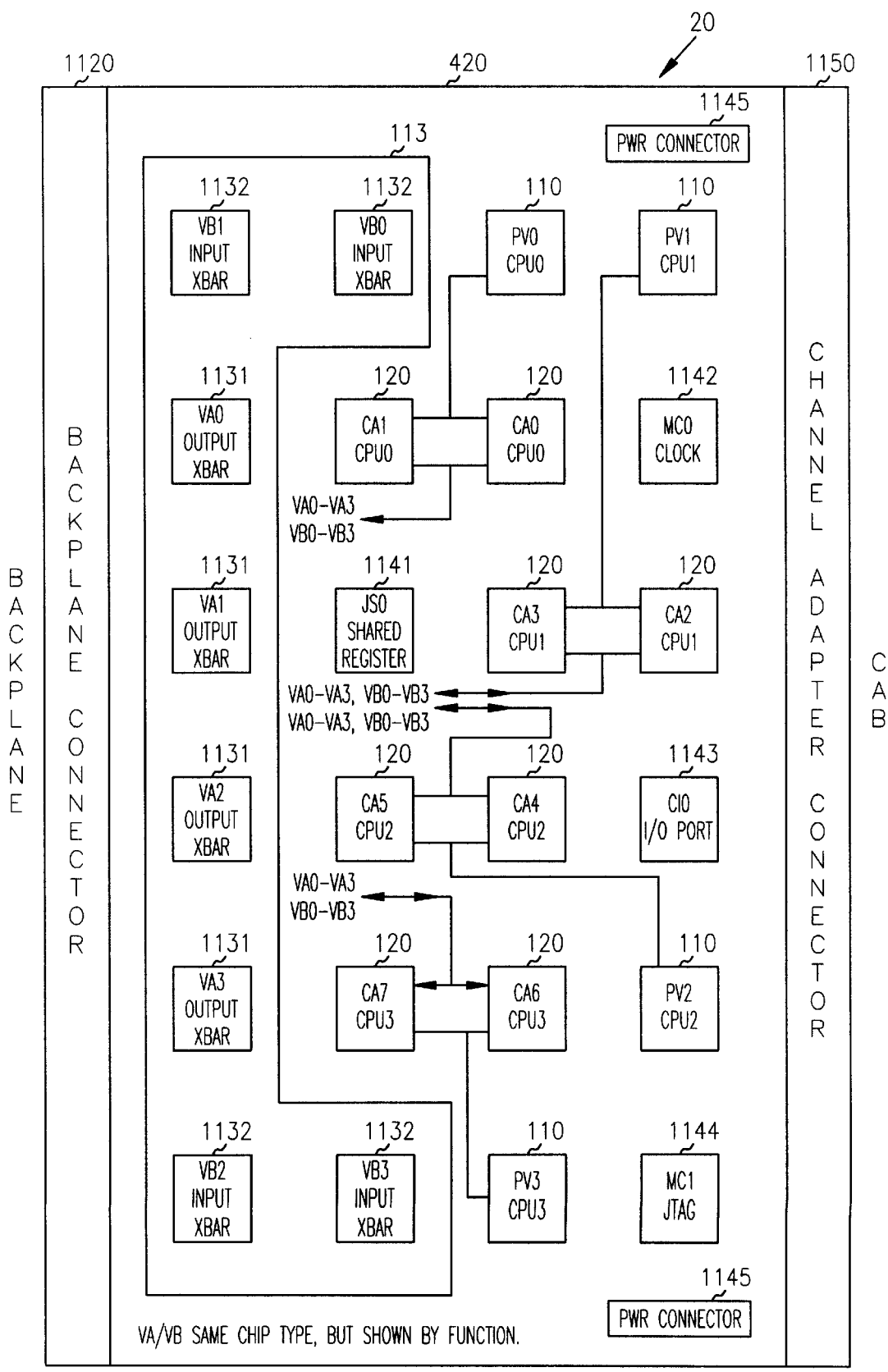
FIG. 4 shows a representation of a multi-processor system 20 on a card 420.

FIG. 4 shows a representation of a multi-processor system 20 implemented on a single multiprocessor card 420 having a common memory interface 112 at a backplane connector 1120. In the embodiment shown, four CPUs 100 are implemented, each having a vector-scalar processor 110 and two caches 120, and all processors sharing a common VA/VB crossbar interface 113 connected to backplane connector 1120. The card 420 includes two power connectors 1145, a master clock chip MC0 1142 and master clock chip MC1 1144 (chip 1144 also includes a set of JTAGs that are used to initialize the processors 110, caches 120, and VA 1131 and VB 1132 chips during each initial deadstart of system 10), a common channel I/O chip 1143 used to input and output data through channel adaptor connector 1150 from and to the I/O subsystem 601 (see also FIG. 1), and a shared variable JS0 chip 1141 (which stores data in a plurality of shared registers used for interprocessor communications and synchronization of processes between processors, the shared registers being read and written by instructions executed in the four processors 110).

Figure 5:
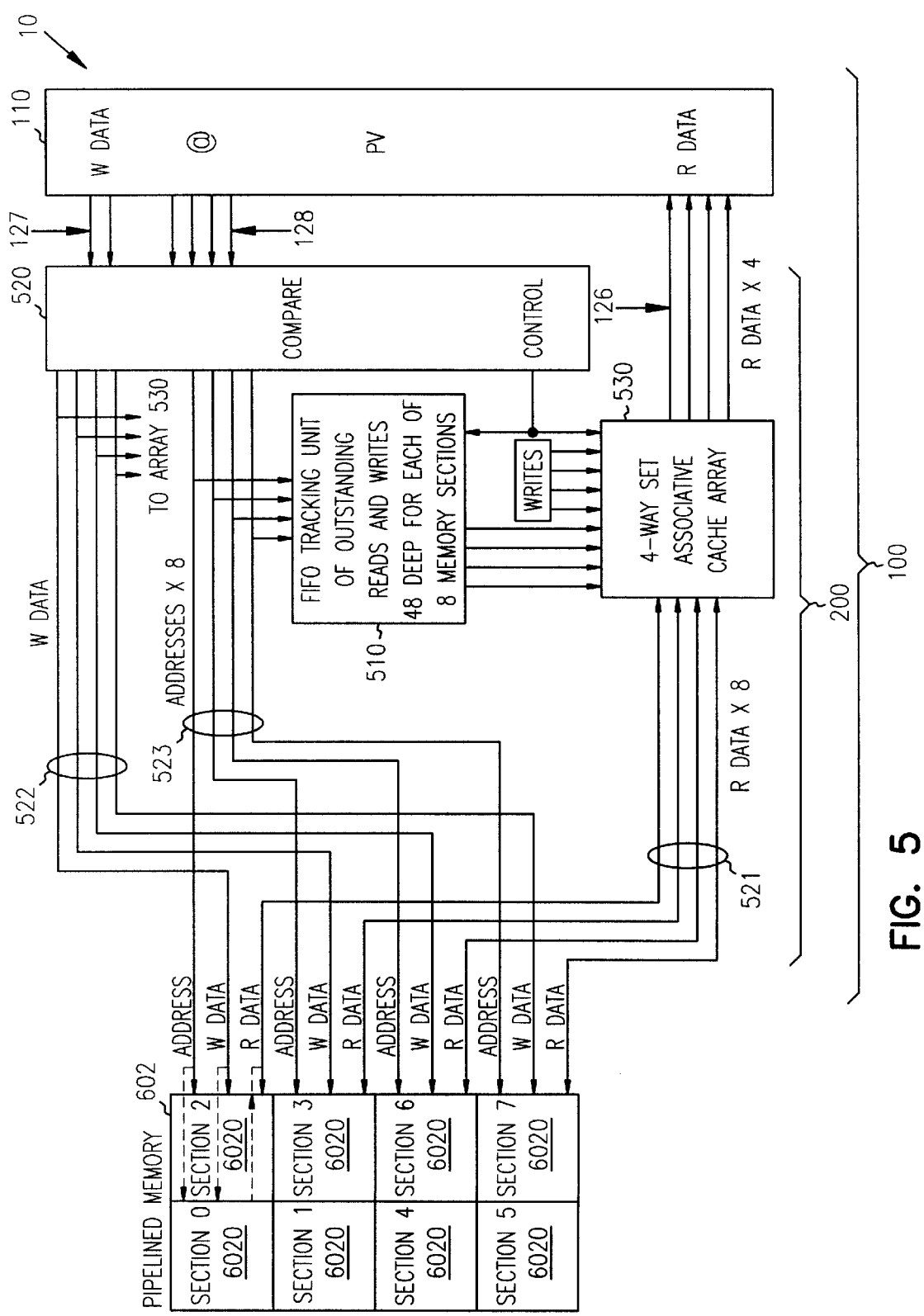
FIG. 5 shows a representation of a scalar/vector computer system 10.

FIG. 5 shows a representation of a scalar/vector computer system 10. In this embodiment, processor 110 transmits four parallel address requests on address busses 128 on each clock cycle. (In the embodiment shown in FIG. 4, only one processor 100 is implemented.) These four addresses are compared by compare unit 520 to the addresses of data in cache array 530, and if a match is found ("a cache hit") for any one or more, the corresponding data for those hits is returned directly from cache array 530 on read-data busses 126. Each address bus 128 is constrained to requests for only two sections of memory 602 (i.e., a first bus is only for addresses contained in sections 0 and 2, a second bus is only for addresses contained in sections 5 and 7, a third bus is only for addresses contained in sections 1 and 3, and a fourth bus is only for addresses contained in sections 4 and 6). Since each address bus 128 to each pair of sections only has addresses for those two sections (of eight total sections 6020 of memory 602), each needs two fewer bits than the entire address (for example 30 bits for a 32-bit address space). For example, one address bus 128 is shared between sections 6020 labeled S0 and S2. In one embodiment, a separate address bus is provided from cache 200 to each section 6020 of memory 602 (i.e., for example eight address busses 523, one to each of eight sections 6020 in system 10), along with a separate read-data bus 521 from cache 200 to each section 6020 of memory 602 (i.e., for example eight read-data busses 521, one to each of eight sections 6020), and a separate write-data bus 522 from cache 200 to each section 6020 of memory 602 (i.e., for example eight write-data busses 522, one to each of eight sections 6020). In one embodiment, each write-data bus is 36 bits wide, and each 72-bit write value is passed serially in two parts. Since the address bus 523 to each section only has addresses for that section, each needs three fewer bits than the entire address.

In one embodiment, FIFO unit 510 includes a separate FIFO for each section 6020 of memory 602. In one such embodiment, each FIFO is 48 positions deep, thus allowing the tracking of up to 48 times 8 requests, or 384 accesses. In one such embodiment, only accesses that miss in the cache (or when the cache is disabled for that type of access), will be placed in the FIFO which tracks outstanding requests to the memory 602. Since each processor 110 can provide four substantially simultaneous references per clock cycle, each processor can have up to 96 serial references outstanding before it gets data back.

In a conventional set-associative cache, addresses for memory data references are converted to cache addresses, for example by hashing (exclusive-OR-ing certain memory address bits with others) or dropping some of the memory address bits in order to derive a cache address which has fewer address bits than the memory address. For this reason, there will be a plurality of "hash synonyms" for each cache address (i.e., many memory addresses will map to the same cache address, and each such memory address which maps to the same cache address is a "hash synonym" to other such addresses). In one embodiment of the present invention, cache 200 is configured as a 4-way associative cache, wherein for each set of hash synonyms, there are provided four cache entries (also called four "ways"), where the four entries all share a common cache base address, called a "hash". In such conventional caches, when a cache miss occurs, the data in one of the ways for that hash (for example, the least-recently-used way) is marked invalid to make space for the new data, and a fetch is initiated to the common memory to read that data. In some processors, processing can continue, and further instructions requesting read data can be processed. However, once the number of references having misses exceeds the number of ways of the cache (e.g., 5 misses to the same hash in a 4-way associative cache), a conventional processor must stop or lock-up, since the processor must obtain and use the data from the first reference before allowing the 5th reference to access one of the ways. This is particularly a problem where accessing the common memory takes a large number of clocks or processor cycles, and where the processor is reading large numbers of data elements as when reading in elements for a vector operand.

In one embodiment, system 10 uses only physical addresses within each CPU 100, and thus no logical address-to- physical address is performed. Physical addresses are thus used for both cache accesses and accesses to memory 602.

One embodiment of the present invention provides a computer system 10 that includes a common memory 602, the memory 602 having a plurality of sections 6020; and a plurality of scalar/vector processors 100 coupled to the memory 602 using a plurality of separate address busses and a plurality of separate read-data busses wherein at least one of the sections of the memory 602 is associated with each address bus and at least one of the sections of the memory 602 is associated with each read-data bus, the processor 100 having a plurality of scalar registers 150 and a plurality of vector registers 160 and operating on instructions which provide a reference address to a data word. Each processor 110 includes a scalar/vector cache unit 200. The cache unit 200 includes a cache array 530 that caches data for vector fetches, scalar fetches, and wherein the cache unit 200 fetches a different amount of data into cache array 530 based on whether a read-data operation is for a scalar register 150 or a vector register 160. In one embodiment, one word of data is fetched into cache 200 for each vector request (no additional data is prefetched beyond the original request), and eight words of data is fetched into cache 200 for each scalar request (seven additional words of data are prefetched beyond the original request). In one such embodiment, each instruction fetch is implemented to fetch 32 words of instruction into cache 200. Thus, in one embodiment of this computer system 10, instruction fetches are run through the cache unit 200, and wherein a different amount of data is prefetched for instruction fetching than the amount of prefetch data for scalar fetches, and than the amount of prefetch data for vector fetches. In one such embodiment, the cache unit 200 can be selectively disabled for instruction fetches and can be selectively disabled for scalar and vector data fetches. In another such embodiment, the cache unit 200 can be selectively disabled for vector data fetches.

The prior-art Cray J-90 computer employed a scalar cache having data stored therein for only scalar references (this cache did not keep data for vector references). Standard RISC (reduced-instruction-set computer) cache designs would have trouble if vector data were to be run through the cache stream of references because with a standard 4-way associative cache, lock-up could occur after 4 outstanding misses. Cache 200 of the present invention permits 48×8 processor outstanding memory references from misses.

FIFO unit 510 maintains the order of arrival of data to match the order of requests (i.e., first-in first-out). Thus, data arriving into the cache will be also passed to the destination register (as specified by the destination code maintained by FIFO unit 510).

In one preferred embodiment, the present invention provides a cache bypass for all requests beyond the first four misses to a 4-way cache entry. Thus, a four-way associative cache is provided, a cache miss (either read or write) causes one way of the cache entry to be allocated for the new address. The cache entry includes two status bits: a tag-valid bit and a data-valid bit. The tag for the cache entry includes a value that matches the address of that entry. When a read miss occurs, the tag is loaded from the address to be read, the tag-valid bit is set (indicating tag valid), and the data-valid bit is zeroed (reset, indicating data invalid). When the data from memory 602 returns and is loaded into the cache 200, the data-valid bit is set (indicating data valid). Once a four-way cache entry has four outstanding misses (i.e., all four tags marked valid and all four data marked invalid), further accesses with the same hash synonym will completely bypass the cache. This allows more than four accesses to miss in the cache without stopping the processor 100. When a write miss occurs, both the tag and the data are written into the cache, and the data is also written to memory 602. When a write is performed, and the tag is found in the cache, but the data-valid bit is not set (indicating an outstanding read is in progress but the data is not returned yet), the tag-valid bit is reset and the data-valid bit is set (thus the read data is not placed into the cache when it returns, but that read data is still forwarded to and loaded into the destination register. Thus, on a read-miss followed by a write miss to the same address, neither the read data nor the write data are placed into the cache, and the tag-valid bit and the data-valid bit are zeroed (marked invalid). The term "stale" as used in this description refers to data which do not reflect the latest and most current values for such data. The data-valid bits are zeroed when a cache miss occurs to prevent reading stale data. Once a tag and its associated data are both loaded into a cache entry (by completing a read operation or write operation), that entry's data-valid bit is set. In one embodiment, in order to invalidate the entire cache (i.e., by a cache invalidate operation), the tag-valid and data-valid bits are reset. The read operation which was performed first is completed and the proper destination register is loaded with the requested (older) data, and the write operation is completed with the memory location loaded with the newer data. The cache entry is thus loaded with neither data value in this embodiment. The tag-valid bit is reset and the data-valid bit is set (to distinguish from an unallocated entry which has both bits reset). This embodiment is described further below.

In another such embodiment, on a read-miss followed by a write-miss, the write data is loaded into the cache and the data-valid bit is set (marking data valid), and when the original read data returns from memory 602, it bypasses the newer data in the cache, and is loaded into the proper destination register as indicated by its respective destination code. Thus the location in memory and the cache location are loaded with the newer data value (the cache marked valid), and the older value is loaded into the proper destination register once it arrives from the memory 602.

In other embodiments, the cache replaces (i.e., invalidates) old data in the cache only when the new replacement data has arrived from the common memory 602. This allows the entry (or way) of the cache for that data value to be immediately available for items further back in the FIFO unit 510. In one embodiment, FIFO unit 510 includes 8 separate independent FIFOs, one for each section 6020 of memory 602, each FIFO advancing data reference tracking independently of the others. Thus, in the present invention the FIFO eliminates the processor lock-up that would otherwise occur after the number of cache misses equaled the number of ways in the cache, greatly increasing the number if outstanding references due to misses.

In one embodiment, the Cache 200 of the present invention also limits line size to one word for vector references. Therefore, one tag is associated with one word. The typical line in a cache contains 4 to 8 words, where each word is 8 bytes (64 bits, plus parity or ECC if used). The limited line size for vector references is explained by the concept of spacial locality. When accessing scalar references in a cache, the prefetching of approximately 8 words (i.e., where a line size is equal to 8 words) obtains greater spacial locality of the fetched words. This spacial locality is not needed with vector references. However, with scalar references, the cache 200 of the present invention prefetches approximately 8 words to obtain spacial locality. In other words, the cache has a line size (the number of words that are replaced on a cache miss) that varies between 1 word and 8 words, depending on whether the processor 100 is performing vector references or scalar references, respectively.

Each cache line is associated with a tag that stores the common memory address that the data value in cache is from. Increasing the number of words per line decreases the overhead of tag storage and comparison. Increasing the line size also increases the hit ratio for certain patterns of data references (scalar references with a high locality of references). Other reference patterns such as strided vector reads and scatter-gather operations do not benefit for line sizes over one word per line.

In one embodiment, each cache line is one word long, and has a separate tag. Vector references will fetch only one word. Scalar read references however, cause processor 110 to issue four parallel read references, one of which is returned to processor 110 and cache 200, and the other three are "prefetch" data that are returned only to cache 200. In another such embodiment, for each scalar read request, eight words are fetched (e.g., two sequential groups of four parallel requests, such that one request is made to each of eight sections 6020) (seven of which are speculative prefetch data that are placed into cache 200 on the expectation that at least some of the data will be needed before it disappeared from the cache (overwritten by other data).

Prior-art Cray machines made up to two references per clock to a common memory, but did not present multiple references per clock to a cache. Cache 200 of the present invention handles four memory references per clock as compared to one memory reference per clock for standard caches today. This higher bandwidth is to accommodate vector operations.

Cache 200 of the present invention invalidates large amounts of data in a relatively few clock cycles (e.g., 256 K bytes in approximately 6 to 8 clock cycles). A conventional cache invalidates approximately one line of data (i.e., about 8 words or 64 bytes) per clock cycle. Invalidating the cache is typically performed when swapping tasks in the computer. One embodiment of the present invention provides an invalidate-cache signal 310 (see FIG. 3) from processor 110 to each cache chip 120, which is activatable by a program instruction (e.g., a "test-and-set" instruction) and/or task-swap function. In one such embodiment, the exchange package 180 (see FIG. 1) for a task includes a disable-cache-invalidate field 181 which inhibits the operation of the cache invalidate instruction and/or function.

Cache 200 of the present invention permits destination cache for data that handles 48 outstanding references per processor to each of eight sections of memory (up to 384 outstanding references for each of four processors) for one embodiment of the present invention. Tracking information for these outstanding references are stored in a FIFO. In the FIFO, a read reference designates 1) the destination code; and 2) information on what to do with data in the cache (whether it goes in cache and where it goes if it does go in cache); and 3) information on fetch vs. store data reference.

The 48 times 8 outstanding references are possible because there are 8 FIFO's, each having 48 entries deep. Therefore, if misses occur, data is returned from memory in order and information is taken out of the FIFO to tell the CPU what to do with the data. In a normal cache, if you have one miss, the information is buffered by the "ways" of the associative cache, so that you can handle more misses. For example, approximately 4 misses are typically buffered in a four-way associative scalar cache. If vector elements were run through (i.e., stored into) such a conventional cache, lock-up and or thrashing would severely degrade performance. Thus, such caches are typically only used for scalar references.

Buffering of the information necessary to tell the CPU what to do with return data from memory is not new, but the significantly increased buffering using 8 FIFOs each 48-entries-deep for containing this information to handle the 48 times 8 outstanding references is new. The criteria to determine how many FIFO's and how deep the FIFO's should be is determined by how many clocks and buffering covers a round trip to memory and back. Thus, FIFO unit 510 provides buffering sufficient to cover a round trip to memory and back, and is the necessary buffering to handle the number of outstanding references needed in the vector cache.

When making vector references to a cache, there are a large number of references. In cache 200 of the present invention there are 48 times 8=384 outstanding references possible. Since the cache can handle 4 references per clock cycle, cache 200 of the present invention can make four references on each of 96 clock cycles in a row before it gets data back. In this way, data can be streamed and the processor 110 does not have to be stopped (waiting for data to arrive or for a cache entry to be made available) and then allowed to proceed. In addition, cache 200 of one embodiment, the present invention is a write-through cache, to permit a stream of write data without allocation because there is one word per cache line for vector references.

The term "write through" (also called "store through") as used in this description is defined as the action of storing a data value from a register into data cache as a part of the operation storing that data value to the corresponding location in the common memories 602. In a write-through operation, processor 110 appears to write the data through data cache 200 to the common memories 602.

Cache 200 of the present invention allows four references per clock cycle because cache is divided into four portions and references can be made independently to each portion. In one embodiment described above, two cache chips CA0 120 and CA1 130 implement the cache 200, and cache chip CA0 120 includes a first portion for sections 0 and 2 of memory 602 and a second portion for sections 5 and 7 of memory 602, while cache chip CA1 130 includes a third portion for sections 1 and 3 of memory 602 and a fourth portion for sections 4 and 6 of memory 602.

In one embodiment as described hereinafter, each processor 110 uses 32-bit addresses. Two of the address bits, bits 0 and 2, are consumed by the processor PV chip 110 when resolving which of the four memory ports 128 to use. Bits 31-3 and bit 1 of the reference address are sent to cache 200. Bits 12-3 and bit 1 of the address are used as a set index within cache 200 which address one of the 2 k sets per port. Bits 31-13 of the address are used as a tag in the cache. These bits are stored on an allocation and are compared to subsequent reference addresses to determine a hit or a miss.

Set State for Each Cache Entry

Each set has eight valid bits and a five-bit LRU (least recently used) code. Two of the eight valid bits are assigned to each of the four set elements. A set element includes one tag and one data word. The two bits are labeled TV (tag valid) and DV (data valid). The state is as follows.

| TV | DV | Cache state |
|---|---|---|
| 0 | 0 | Empty. Line's tag is undefined. Never a tag match. |
| 1 | 0 | Memory update pending. Set to this state on a read allocation. Remains in this state until data from memory is written or a write request is made to this line. |
| 0 | 1 | Memory update invalid. Set to this state on a write hit to a memory update pending line. Remains in this state until memory update data is returned and discarded. |
| 1 | 1 | Full. Set to this state from memory update pending and memory update invalid when memory read data returns. Set to this state on a write allocation. |

If the least-recently-used way is in the memory update pending or invalid state, no allocations of any way will be made on a miss.

State Transition Table

| Type of Access | Tag Match | TV | DV | |
|---|---|---|---|---|
| | | | | Result (Matching Way) |
| READ | Y | 1 | 1 | Normal Read Hit. Only LRU changes. |
| READ | Y | 1 | 0 | Read Miss no allocate. Only LRU changes. |
| READ | Y | 0 | 1 | Read Hit. Only LRU changes. |
| WRITE | Y | 1 | 1 | Write hit. Data and LRU change. |
| WRITE | Y | 1 | 0 | Write hit. Data, TV, DV and LRU change. |
| WRITE | Y | 0 | 1 | Write hit. Data and LRU change. |
| | | | | Result (LRU Way) |
| READ | N | 1 | 1 | Re-allocate LRU way. Tag, DV, and LRU change. |
| READ | N | 1 | 0 | Miss no allocate. No LRU changes. |
| READ | N | 0 | 1 | Miss no allocate. No LRU changes. |
| READ | N | 0 | 0 | Allocate LRU. Tag, TV, DV, and LRU change. |

-continued

State Transition Table

| Type of Access | Tag Match | TV | DV | |
|---|---|---|---|---|
| WRITE | N | 1 | 1 | Re-allocate LRU way. Tag, DV, and LRU change. |
| WRITE | N | 1 | 0 | Miss no allocate. No LRU changes. |
| WRITE | N | 0 | 1 | Miss no allocate. No LRU changes. |
| WRITE | N | 0 | 0 | Write Allocate. Tag, Data, TV, DV and LRU. |

The LRU code is an eight bit entity that keeps track of the order of set element use from most recently used to least recently used. Bits 4 and 3 contain the most recently used element, bits 2 and 1 contain the next most recently used element. Of the two elements that are not in bits 4 through 1, bit 0 is clear if the smaller element number is the least recently used element, and is set otherwise.

Read Operation

For a read, the cache is checked for a hit. A hit is indicated by a tag compare and an associated data-valid bit set. If there is a hit, the cache data is placed on the port read data path. If there is a tag compare and the tag-valid bit is set but the data-valid bit is clear, the cache reference results in a miss but no allocation is made. If there is a miss and the LRU element has both TV set or DV set but not both, no allocation is made. If there is a miss, and the LRU element has both TV and DV clear or both TV and DV set, an allocation is made. On a read allocation, the tag portion of the address is stored into the allocated element, the TV bit is set while the DV bit is clear, and a reference is made to memory. The LRU code is updated after a hit or an allocation, with the hit or allocated element becoming the new most recently used element.

Section Queue for Reads

Each of the four memory sections referenced by a cache chip has its own section queue for reads. The section queue operation depends on memory read data being returned in order of reference for each memory section. When a read reference is made, a flag indicating returned data is to be written to the cache, the set index, and an element pointer are stored in the section queue. Other information stored is the destination queue and a maintenance bit for maintenance reads.

Write Operation

For a write, all references are checked against the cache and are sent to memory as well. In the case of a write hit, if both the tag- and data-valid flags are set, the cache is updated with the write data. In the case of a write miss, the LRU set element is allocated, provided its TV and DV bits are both set or both clear. The tag and data are stored, and the associated TV and DV bits are set. If there is a tag compare on a write to a location that has its tag-valid bit set and data-valid bit clear, the new data is stored into the set element, the TV bit is cleared, and the data-valid bit is set. This will happen after a write to a memory address that has been previously read and allocated, but the read data has not made it back from memory. The TV clear and DV set are used to indicate that the read data should not be stored in the cache. After the read data is returned, the TV bit gets set.

Back-to-back Same Set Accesses

Any reference to an index potentially changes the set's state. A subsequent reference to the same index within 6 clock periods will read the old valid set state rather than the modified state that is stored after completion of the read/modify/write cycle. For this reason, special accommodations are required for back to back accesses of the same index. The following table indicates the changes made to the state in response to the previous set state. In the case of a tag match, the valid bits correspond to the set element that matches. If there is no match, the valid bits are taken from the LRU set element.

In all of these cases, simply treating a subsequent read message as a miss will always assure a correct result since the memory 602 will always be coherent and since a set does not require a state change due to a read access. A state change will generally result from a read operation, but skipping a cache access on a read does not make any cache contents invalid. For a write, a state change may be required. A cached address that is written too must be updated or invalidated in the cache in order to maintain cache coherence with system memory.

On a write, it is necessary to update the cached data on a hit. For a cache element that is in the process of being updated, as indicated by a TV bit without the DV bit, it is also necessary to clear TV and set DV to prevent the cache data from being written by the update data. If a location has a TV clear and DV set condition, it is necessary to prevent the update from happening. There is no apparent way to avoid a cache access on a write. Even an invalidate set cannot be done unless there is a way to stop data updates from a previous read allocation on a set basis. The solution is to compare the index of a previous access and use the write data from the previous access as the new set state.

Cache Array 530 Contention

There are three access paths into the cache array (i.e., RAMs) 530 which store cached data. The cache array data RAMs 530 are read on a speculative basis and in parallel with tag reads on a PV read reference from a processor 110. Of the data read, one word will be returned to a PV processor 110 if there is a hit in the cache, none of the data read will be used if there is a cache miss. A second access source is a write of PV reference data on a PV write reference (from a processor 110) that results in a hit or an allocate. The final method of access is a write to the cache array 530 of memory data which completes the read allocation process. Writes of PV data from processor 110 to the cache array 530 are put into a delayed PV reference queue. This queue can also hold PV read references for data which was unavailable when a PV read reference first occurred.

The priorities for access types are: first—memory, second—the PV reference queue, and finally—speculative PV reads. The memory data writes get first priority since the memory path can have the most outstanding references, and the path from memory 602 assumes that a memory read reference, once initiated, can go to completion. The memory path also gets highest priority since it is the highest latency reference type. PV read references (for a processor 110) continue as normal even if a data word is unavailable due to a conflict with a memory write. The cache control functions as normal in this case, and may result in a miss or a hit to one of the data words that was read. If a hit occurs to the word that was not read due to a conflict, the cache reference is placed in a delayed reference queue. The reference will complete, and read data will be returned to the PV, as soon as the RAM location becomes available. If there is a conflict between a delayed reference and a memory data write, the memory data write gets preference. If there is a conflict between a delayed PV and a speculative read, the delayed PV reference gets priority. A conflict with a delayed PV reference from an earlier reference may subsequently cause another PV read reference to go into the delayed reference queue. All writes of PV data to the cache are placed in the delayed PV reference queue. This assures that prior reads in the delayed PV reference queue are completed in order with respect to the PV cache write. The particular data ram that is the destination of the PV write reference is flagged as unavailable for speculative read references until the PV write to cache completes. A hit to a data ram that is flagged as unavailable will result in a reference going to the delayed reference queue. This assures that subsequent reads to the same address as a prior write will be performed in order.

Cache Chip 120 Data Path Contention

There are a number of sources of data path contention internal to the cache 200. For each port, the cache is subdivided into two sections. Each section's RAM block for data and for tags have a two-clock-period access. Therefore, consecutive references to the same section must have a clock of delay between them. Other sources of cache contention are a write to a cache line. There are two write sources. The write data may come from the PV on a write hit or allocate, and the write data from memory on a read allocate. Tags will always be written from the PV address path.

Another source of contention occurs on the data path on the PV. Memory read data and cache read data on a read hit are transmitted across the same read data path on the PV. It is expected that the cache will stall to accommodate memory data since memory data cannot be stopped.

The contention between reads and writes to a cache location, both tag updates and writes of data, can be eliminated by using two-port RAMs, RAMs with separate read and write addressing. Since two-port RAMs take more area than single-port RAMs, the cache size would be reduced. There would still be contention between the multiple sources of write data, the PV and the memory.

Cache Data Protection

Tags and cache data will be protected by a single parity bit. A parity error on a tag or data read will be treated as a cache miss. Data will not be protected on the cache chip outside of the tag and data RAMs, and will not be protected when passed to or received from the PV. SECDED will be generated on the cache as data is written to memory, and will be checked on memory read data immediately after it arrives.

Cache Invalidation

The PV raises the pv_inval signal to invalidate the cache. A cache invalidate clears all valid bits, essentially clearing the cache of all data. All LRU codes are returned to an initial starting point. Any memory read references which are outstanding at the time of invalidation will not be used to update the cache.

Maintenance References

There are two maintenance signals, one for a read and one for a write. A write reference coincident with the maintenance write bit causes destination code bits [7:0] to be substituted for generated check bits. A read reference coincident with the maintenance read bit causes check bits returned form memory to be substituted for eight of the data bits.

Check bit 0 is returned in data bit 0.
Check bit 1 is returned in data bit 8.
Check bit 2 is returned in data bit 16.
Check bit 3 is returned in data bit 24.
Check bit 4 is returned in data bit 32.
Check bit 5 is returned in data bit 40.
Check bit 6 is returned in data bit 48.
Check bit 7 is returned in data bit 56.

Maintenance writes do not allocate in the cache and maintenance reads bypass the cache for memory.

SECDED Error Reporting

Bit 1 of the read-data-valid signals, cae_rvld for the even port and cao_rvld for the odd port, indicate that a SECDED error is being reported. Bit 1 and 0 will both assert to report a double-bit error, and bit 1 will assert without bit 0 to report a single-bit error. Error data will be reported on the data lines instead of read data when an error is indicated.

In one embodiment, double-bit errors on memory data that go only to the cache are not reported. Any data with a double-bit error will not be stored in the cache. This causes the cache location to wait for memory data (and miss on reads) indefinitely, or at least until there is a cache invalidate. Single-bit errors on memory data that is going only to the cache will be reported and the data will be stored in cache. A cache error, with err_data bits 23-20 all ones, can be both correctable and uncorrectable. A correctable cache error is an error that was detected in time to undo a cache hit and miss instead. The bad cache location is simply not used. An uncorrectable cache error is an error that is detected too late to cause a cache miss and make a read reference.

Error-data bits [23:20] indicate a reference type as follows.
  Err_data [23:20]=0010=SECDED error on exchange
    0001=SECDED error on fetch
    0110=SECDED error on B reg
    0101=SECDED error on T reg
    1000=SECDED error on V reg
    1110=SECDED error on A/S reg
    1111=cache error
  Err_data [19]=uncorrectable error
  Err_data [18]=correctable error
  Err_data [17:10]=bits [9:2] of the reference address for PV 110 to CA 120 (Note this is not the same as the system address bits [9:2])
  Err_data [9:8]=0 and will be set to system address bits [1:0] by the PV
  Err_data [7:0]=syndrome The bad address bits 8 and 9 are sent as zeroes by the cache and defined in the PV chip.

Selective Data, Instruction Caching

The read reference type is determined by bits [9:6] of the destination code as follows:
  If dest_code [9:6]=1xxx, it is a vector read reference
  If dest—code [9:6]=01xx, it is a fetch reference
  If dest—code [9:6]=001x, it is a B or T read reference
  If dest—code [9:6]=0001, it is an A or S read reference
  If dest—code [9:6]=0000, it is a scalar read ahead If pv_dce (data cache enable) is asserted, the cache will check for read hits and make read allocation on all reference types except fetch references. It will also check for hits and make allocation on all write references (for both scalars and vectors).

If pv_ice (instruction cache enable) is asserted, the cache will check for read hits and make read allocations on fetch references. It will check for write hits (although there shouldn't be any) but will not make any allocations on write references.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer system comprising:
   a common memory, the memory having a plurality of sections; and
   a scalar/vector processor coupled to the memory using a plurality of separate address busses and a plurality of separate read-data busses wherein at least one of the sections of the memory is associated with each address bus and at least one of the sections of the memory is associated with each read-data bus, the processor having a plurality of scalar registers and a plurality of vector registers and operating on instructions which provide a reference address to a data word, the processor comprising:
      a scalar/vector cache unit, the cache unit including:
         a cache array, and
         a FIFO unit that tracks
            an address in the cache array to which a read-data value will be placed when the read-data value is returned from the memory, and
            a destination code that specifies which of the scalar registers and vector registers into which the read-data value is to be loaded when the read-data value is returned from the memory,
   wherein the FIFO unit provides a plurality of FIFOs, each FIFO associated with one or more of the sections of the memory, and wherein the memory includes about eight sections, the FIFO unit includes an equal number of FIFOs, one of the FIFOs associated with each one of the sections, and each FIFO including about forty-eight positions.

2. The computer system according to claim 1, wherein the scalar/vector processor is further coupled to the memory using one or more separate write-data busses, and wherein the write-data busses are fewer in number than the read-data busses.

3. The computer system according to claim 1, wherein the cache unit includes a plurality of caches including a first cache and a second cache, and wherein a first subset of the sections is associated with the first cache and a different subset of the sections is associated with the second cache.

4. The computer system according to claim 1, wherein instruction fetches are stored in the cache unit, and wherein a different amount of data is prefetched for instruction fetching than the amount of prefetch data for scalar fetches, and than the amount of prefetch data for vector fetches.

5. The computer system according to claim 1, wherein the cache unit can be selectively disabled for instruction fetches and can be selectively disabled for scalar and vector data fetches.

6. The computer system according to claim 1, wherein the cache unit fetches a different amount of data based on whether a read-data operation is for a scalar register or a vector register.

7. The computer system according to claim 6, wherein the cache unit includes a plurality of caches including a first cache and a second cache, and wherein a first subset of the sections is associated with the first cache and a different subset of the sections is associated with the second cache.

8. The computer system according to claim 6, wherein instruction fetches are stored in the cache unit, and wherein a different amount of data is prefetched for instruction fetching than the amount of prefetch data for scalar fetches, and than the amount of prefetch data for vector fetches.

9. The computer system according to claim 6, wherein the cache unit can be selectively disabled for instruction fetches and can be selectively disabled for scalar and vector data fetches.

10. The computer system according to claim 6, wherein the scalar/vector processor is further coupled to the memory using one or more separate write-data busses, and wherein the write-data busses are fewer in number than the read-data busses.

11. The computer system according to claim 10, wherein the cache unit includes a plurality of caches including a first cache and a second cache, and wherein a first subset of the sections is associated with the first cache and a different subset of the sections is associated with the second cache.

12. The computer system according to claim 10, wherein instruction fetches are stored in the cache unit, and wherein a different amount of data is prefetched for instruction fetching than the amount of prefetch data for scalar fetches, and than the amount of prefetch data for vector fetches.

13. The computer system according to claim 10, wherein the cache unit can be selectively disabled for instruction fetches and can be selectively disabled for scalar and vector data fetches.

14. The computer system according to claim 10, wherein the cache unit includes a plurality of caches including a first cache and a second cache, and wherein a first subset of the sections is associated with the first cache and a different subset of the sections is associated with the second cache, wherein instruction fetches are stored in the cache unit, wherein a different amount of data is prefetched for instruction fetching than the amount of prefetch data for scalar fetches, and than the amount of prefetch data for vector fetches, and wherein the cache unit can be selectively disabled for instruction fetches and can be selectively disabled for scalar and vector data fetches.

15. A method for caching data in a computer system, the system having a common memory having a plurality of sections, and a scalar/vector processor coupled to the memory using a plurality of separate address busses and a plurality of separate read-data busses wherein at least one of the sections of the memory is associated with each address bus and at least one of the sections of the memory is associated with each read-data bus, the processor having a plurality of scalar registers and a plurality of vector registers and operating on instructions which provide a reference address to a data word, the processor having a scalar/vector cache unit, the cache unit including a cache array; the method comprising:
   dividing read requests into groups of requests based on which section each read request is directed towards;
   transmitting a series of addresses on each of the plurality of address busses requesting that a plurality read-data values be placed on each of the plurality of read-data busses;
   for each address on each address bus, tracking both
      an address in the cache array to which a read-data value will be placed when the read-data value is returned from the memory, and
      a destination code that specifies which of the scalar registers and vector registers into which the read-data value is to be loaded when the read-data value is returned from the memory, and
   where in the memory includes about eight sections, one of the group s of requests is associated with each one of the sections, and each group including up to about forty-eight requests.

16. The method according to claim 15, further comprising:
dividing read requests into groups of requests based on which section each read request is directed towards, and
wherein the step of tracking further comprises
separately tracking each of the groups of requests.

17. The method according to claim 15, wherein the scalar/vector processor is further coupled to the memory using one or more separate write-data busses, and wherein the write-data busses are fewer in number than the read-data busses, wherein the step of transmitting addresses includes transmitting a read request or a write request on each address bus, and wherein the number of write requests which can be transmitted in a given period of time is fewer than the number of read requests.

18. The method according to claim 15, wherein the cache unit includes a plurality of caches including a first cache and a second cache, further comprising:
associating a first subset of the sections with the first cache and a different subset of the sections with the second cache.

19. The method according to claim 15, further comprising:
caching instruction fetches, wherein the amount of prefetch data for instruction fetching differs from the amount of prefetch data for scalar fetches and differs from the amount of prefetch data for vector fetches.

20. The method according to claim 15, further comprising:
selectively disabling caching of instruction fetches; and
selectively disabling caching of scalar and vector data fetches.

21. The method according to claim 15, further comprising:
fetching a different amount of data based on whether a read-data operation is for a scalar register or a vector register.

22. The method according to claim 21, further comprising:
dividing read requests into groups of requests based on which section each read request is directed towards, and
wherein the step of tracking further comprises
separately tracking each of the groups of requests.

23. The method according to claim 21, wherein the scalar/vector processor is further coupled to the memory using one or more separate write-data busses, and wherein the write-data busses are fewer in number than the read-data busses, wherein the step of transmitting addresses includes transmitting a read request or a write request on each address bus, and wherein the number of write requests which can be transmitted in a given period of time is fewer than the number of read requests.

24. The method according to claim 21, wherein the cache unit includes a plurality of caches including a first cache and a second cache, further comprising:
associating a first subset of the sections with the first cache and a different subset of the sections with the second cache.

25. The method according to claim 21, further comprising:
caching instruction fetches, wherein the amount of prefetch data for instruction fetching differs from the amount of prefetch data for scalar fetches and differs from the amount of prefetch data for vector fetches.

26. The method according to claim 21, further comprising:
selectively disabling caching of instruction fetches; and
selectively disabling caching of scalar and vector data fetches.

27. A computer system comprising:
a common memory, the memory having a plurality of sections; and
a plurality of scalar/vector processors coupled to the memory using a plurality of separate address busses and a plurality of separate read-data busses wherein at least one of the sections of the memory is associated with each address bus and at least one of the sections of the memory is associated with each read-data bus, the processor having a plurality of scalar registers and a plurality of vector registers and operating on instructions which provide a reference address to a data word, each processor comprising:
a scalar/vector cache unit, the cache unit including:
a cache array that caches data for vector fetches, scalar fetches, wherein the cache unit fetches a different amount of data into cache array based on whether a read-data operation is for a scalar register or a vector register,
a FIFO unit that tracks an address in the cache array to which a read-data value will be placed when the read-data value is returned from the memory, wherein the memory includes a plurality of sections, the FIFO unit includes a number of FIFOs equal to the number of sections, and one of the FIFOs is associated with each one of the sections,
wherein the memory includes about eight sections and each FIFO of each FIFO unit includes about forty-eight positions.

28. The computer system according to claim 27, wherein the scalar/vector processor is further coupled to the memory using one or more separate write-data busses, and wherein the write-data busses are fewer in number than the read-data busses.

29. The computer system according to claim 27, wherein the cache unit includes a plurality of caches including a first cache and a second cache, and wherein a first subset of the sections is associated with the first cache and a different subset of the sections is associated with the second cache.

30. The computer system according to claim 27, wherein instruction fetches are stored in the cache unit, and wherein a different amount of data is prefetched for instruction fetching than the amount of prefetch data for scalar fetches, and than the amount of prefetch data for vector fetches.

31. The computer system according to claim 27, wherein the cache unit can be selectively disabled for instruction fetches and can be selectively disabled for scalar and vector data fetches.

32. A method for caching data in a computer system, the system having a common memory having a plurality of sections, and a plurality of scalar/vector processors each coupled to the memory using a plurality of separate address busses and a plurality of separate read-data busses wherein at least one of the sections of the memory is associated with each address bus and at least one of the sections of the memory is associated with each read-data bus, each processor having a plurality of scalar registers and a plurality of vector registers and operating on instructions which provide a reference address to a data word, each processor having a scalar/vector cache unit, the cache unit including a cache array; the method comprising:
dividing read requests into groups of requests based on which section each read request is directed towards;

from each of the plurality of processors, transmitting a series of addresses on each of the plurality of address busses requesting that a plurality read-data values be placed on each of the plurality of read-data busses;

for each address on each address bus, tracking both
an address in the cache array to which a read-data value will be placed when the read-data value is returned from the memory, and
a destination code that specifies which processor and which of the scalar registers and vector registers in that processor into which the read-data value is to be loaded when the read-data value is returned from the memory, and wherein the memory includes about eight sections, one of the groups of requests is associated with each one of the sections, and each group including up to about forty-eight requests.

33. The method according to claim 32, further comprising:
fetching a different amount of data based on whether a read-data operation is for a scalar register or a vector register.

34. The method according to claim 32, further comprising:
dividing read requests into groups of requests based on which section each read request is directed towards, and
wherein the step of tracking further comprises
separately tracking each of the groups of requests.

35. The method according to claim 32, wherein the scalar/vector processor is further coupled to the memory using one or more separate write-data busses, and wherein the write-data busses are fewer in number than the read-data busses, wherein the step of transmitting addresses includes transmitting a read request or a write request on each address bus, and wherein the number of write requests which can be transmitted in a given period of time is fewer than the number of read requests.

36. The method according to claim 32, wherein the cache unit includes a plurality of caches including a first cache and a second cache, further comprising:
associating a first subset of the sections with the first cache and a different subset of the sections with the second cache.

37. The method according to claim 32, further comprising:
caching instruction fetches, wherein the amount of prefetch data for instruction fetching differs from the amount of prefetch data for scalar fetches and differs from the amount of prefetch data for vector fetches.

38. The method according to claim 32, further comprising:
selectively disabling caching of instruction fetches; and
selectively disabling caching of scalar and vector data fetches.

* * * * *

UNITED STATES PATENT AND TRADEMARK OFFICE
CERTIFICATE OF CORRECTION

PATENT NO. : 6,496,902 B1
DATED : December 17, 2002
INVENTOR(S) : Faanes et al.

It is certified that error appears in the above-identified patent and that said Letters Patent is hereby corrected as shown below:

Column 5,
Line 50, delete "CAS" and insert -- CA5 --, therefor.

Column 14,
In the table titled "State Transition Table" after "Tag Match" insert -- ? --.

Column 20,
Line 65, delete "group s" and insert -- groups --, therefor.

Signed and Sealed this

Twenty-second Day of July, 2003

JAMES E. ROGAN
*Director of the United States Patent and Trademark Office*